H. S. DOLBEY.
FLUID METER.
APPLICATION FILED JUNE 18, 1914.
1,146,409.
Patented July 13, 1915.
2 SHEETS—SHEET 2.
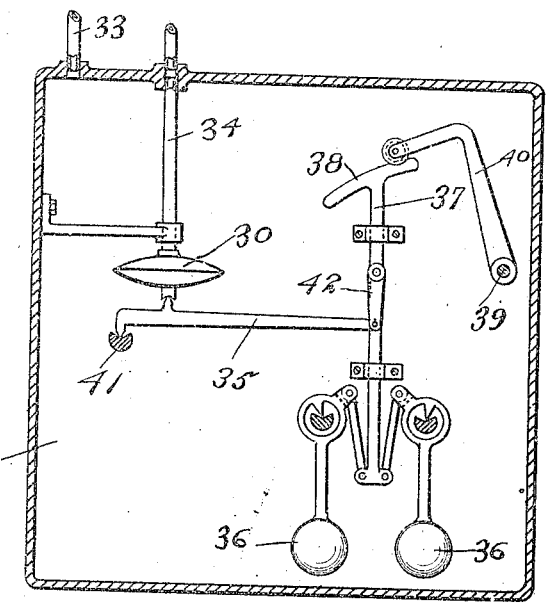
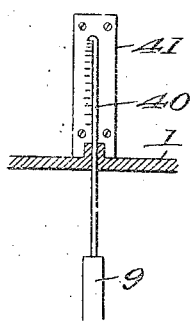
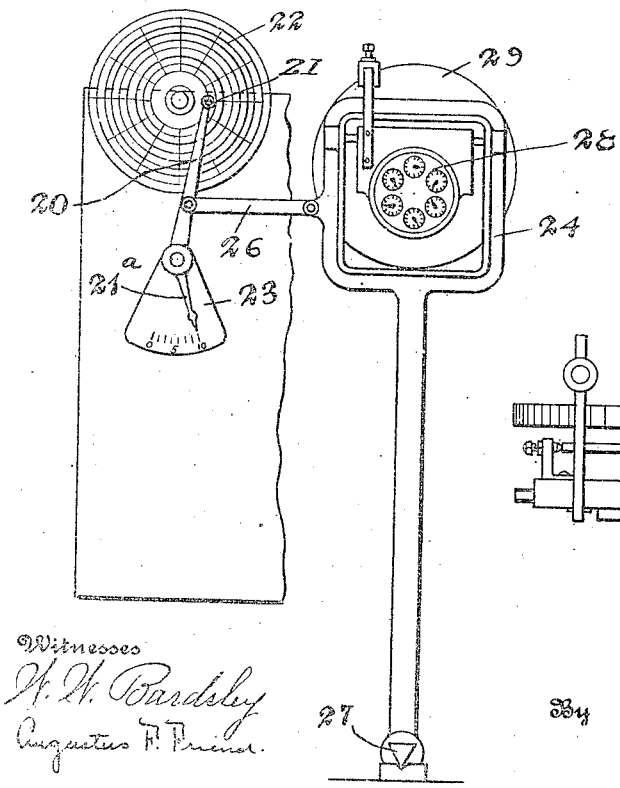
Inventor
Harry S. Dolbey
Witnesses
W. W. Bardsley
Augustus F. Friend
By Howard E. Barlow
Attorney

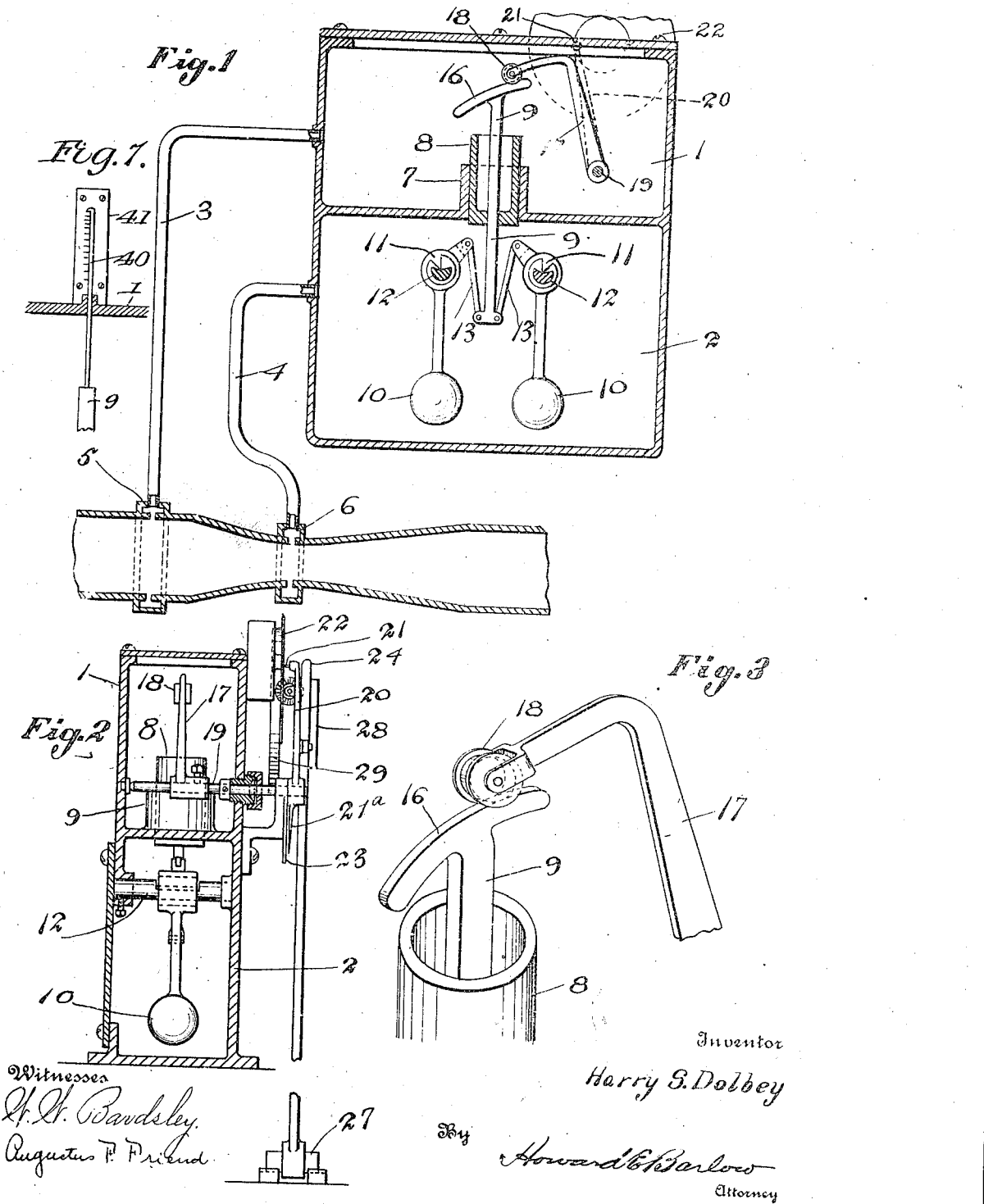

UNITED STATES PATENT OFFICE.

HARRY S. DOLBEY, OF PROVIDENCE, RHODE ISLAND, ASSIGNOR TO BUILDERS IRON FOUNDRY, OF PROVIDENCE, RHODE ISLAND, A CORPORATION OF RHODE ISLAND.

FLUID-METER.

1,146,409.

Specification of Letters Patent.

Patented July 13, 1915.

Application filed June 18, 1914. Serial No. 845,937.

*To all whom it may concern:*

Be it known that I, HARRY S. DOLBEY, a citizen of the United States, and resident of the city of Providence, in the county of Providence and State of Rhode Island, have invented a certain new and useful Improvement in Fluid-Meters, of which the following is a specification.

This invention relates to fluid meters of the class provided with a rate of flow exhibiting device operated by the differences in pressures caused by the flow through the main.

One of the objects of the invention is to provide a meter of this character, which is of simple and comparatively inexpensive construction, and one which is controlled in its action by a movable member, such as a piston or diaphragm, to which the differential pressures are communicated, and to apply means, such as a pendulum or other suitable device for gradually increasing the resistance to the action of said member as the difference in the pressures increases to control in a measure the movement of said member.

A further object of the invention is the provision of exhibiting means in the form of an indicating, integrating or recording instrument arranged to be operated by action of the movable member for showing the rate of flow through the main.

With these and other objects in view, the invention consists of certain novel features of construction as will be more particularly pointed out in the appended claims.

In the accompanying drawings: Figure 1— is a side elevation partly in section showing one form of operating mechanism, the two chambers being in section connected to a Venturi tube shown on a relatively small scale. Fig. 2— is a sectional end elevation of the mechanism shown in Fig. 1. Fig. 3— is an enlarged perspective view showing the cam and its operating arm. Fig. 4— is a rear side view of the casing showing the indicating, integrating and recording mechanism. Fig. 5— is an enlarged edge view of the integrating mechanism. Fig. 6— is a modification showing one form of mechanism operated by means of a diaphragm instead of by a piston as illustrated in Fig. 1. Fig. 7, is a detail showing a rod actuated by the piston extending outside of the compartment for coöperating with a graduated disk.

Referring now to Fig. 1 of the drawings, 1 and 2 designate two water tight chambers or compartments. As herein represented compartment 1 is connected by pipe 3 to the larger section or up stream portion of a Venturi tube at 5, and compartment 2 by pipe 4 to the contracted portion 6 of the Venturi tube, and by means of these pipes the compartments will be filled with the water or gas flowing through the main of which the Venturi tube forms a part. As is well known, when water or gas flows through the Venturi tube the pressure at the contracted portion becomes less than that in the other portion of the main, and consequently in the arrangement illustrated the pressure in compartment 2 also becomes less than that in compartment 1. The Venturi tube is, however, only one of the several well known means of obtaining this difference in pressures, and my invention is not therefore limited to use with a Venturi tube.

Between compartments 1 and 2 is shown a pipe or cylinder 7 open at each end, and in the cylinder 7 is a piston 8 arranged for movement in the cylinder under the influence of differences in pressure in the two compartments. Attached to the piston 8 to partake of its motion and extending downwardly into compartment 2, is the piston rod 9. Suspended in compartment 2 are the pendulums 10 supported on knife edges 11, (Fig. 1), resting upon the supporting arms 12, (see particularly Fig. 2). The rods of the pendulums extend above their respective points of support and are connected at their upper ends with the piston rod 9 by means of the links 13, or other suitable connections. I prefer to use the two pendulums shown in the drawings, as constituting the best mechanical combination, but one pendulum could be made to perform all necessary functions. As shown in the drawings the piston rod 9 extends above the piston and bears upon its upper end a cam 16, the purpose of which will be hereinafter stated. An arm 17 extends above this cam and has a roller 18 at its end resting upon the cam. The arm 17 is rigidly attached to the shaft 19, Fig. 2, which extends through a stuffing box to the outside of the compartment 1, and attached to the outer end of this shaft is an arm 20 which may carry a pen 21 at its outer end. This pen is arranged to be moved over the surface of the recording disk 22, see Fig. 4. In this figure the opposite end of this arm is shown as being provided with a pointer 21ª adapted to be moved across the face of a graduated fixed plate 23 to serve as an indicator for indicating the rate of flow in the pipe at the time of observation. If an integrator or counter is desired to show the total of the flow the same may be mounted on the frame 24 and connected to the arm 20 by the link 26. This frame is preferably supported on a knife edge 27 at its lower end providing an inverted pendulum which may carry the weight of the counter mechanism 28 across the face of the usual driving disk 29. As this exhibitor mechanism is shown and described in Patent No. 920,025 further description of the same is deemed unnecessary.

Fig. 6 illustrates a modification showing one form of mechanism more particularly adapted for use in measuring gas. The mechanism is arranged to be operated by means of a diaphragm 30, whose upper and lower walls are adapted to move toward and from each other, the same being located within a chamber 32 which latter is connected to the throat portion 6 of the Venturi tube, by means of the pipe 33, and the interior of the diaphragm 30 is connected by means of the pipe 34 to the up stream portion 5 of said tube. The differences in pressure act upon the diaphragm 30 to expand the same and cause it to press against the lever 35. The short end of this lever is supported at 41 while the other end is connected by the link 42 to the rod 37. The expanding movement of the diaphragm receives a gradually increasing resistance by the outward swinging of the pendulum or weights, 36 which are connected to the vertically reciprocable rod 37. On the end of this rod is mounted a cam 38 which communicates motion to the exhibiting means as above described through the shaft 39 and cam arm 40.

The operation of my improved meter is as follows: As the difference in pressures increases by a greater flow through the Venturi tube and this difference is transmitted through the pipes 3 and 4 to the compartments 1 and 2, the piston 8 is pushed downward, and this motion is resisted by the pendulums by reason of the upper ends of their shanks or rods being pulled toward each other through the links 13, and their resistance is gradually increased as the weights swing outward from their vertical position. If it is desired to obtain only some visual indication of the flow through the main, it can be readily done by connecting a rod 40, see Fig. 7, or similar device attached to the piston and extending outside of the compartment 1 to work over a graduated plate 41. Where a record is desired it can be obtained by a pen moved by the piston, but as the flow through the main is not directly proportional to the differences in pressures caused by the flow, a fact well known to those acquainted with the art,—some correction in addition to the effect of the pendulums acting upon the piston must be made in order to obtain an accurate record. As is well known, this correction can be made in the spacing of the rulings upon the paper dial in the ordinary way to the disk 22, but it is frequently desirable to use a planimeter to measure the space inclosed by the line traced by the pen or to have equal rulings upon the dial so that the amount of the flow may be approximated, and in such cases it is necessary to interpose mechanism between the piston and the pen to cause the movement of the latter to be directly proportional to the flow in the main. I have shown in the drawings a cam the surface of which is so cut as to accomplish this result.

In the device illustrated in the drawing it is to be understood that the disk 22 is rotated by clock work in the usual manner.

I claim:

1. In a meter the combination with means in a main for causing differences of pressures by a flow therethrough, of a movable member actuated by the differential pressures in said pipe, a pendulum arranged to apply a gradually increasing resistance to a movement of said member in one direction, exhibiting means, a member for operating said exhibiting means, and means operated by said movable member for actuating said operating member in proportion to the square root of said differential pressures.

2. In a meter the combination with means in a main for causing differences of pressures by a flow therethrough, of a movable member actuated by said differences of pressures, a pendulum for applying a gradually increasing resistance to the movement of said member in one direction, means for operatively connecting the pendulum with said member, exhibiting means, a movable member for operating said exhibiting means, and a cam surface moved by said movable member and arranged to act upon said exhibitor operating member to move the same in a predetermined relation to the differential pressures.

3. In a meter the combination with means in a main for causing differences of pressures by the flow therethrough, of two chambers to which the differences of pressures are communicated, a movable member between said chambers to be acted upon by the pressure of both, a pendulum operatively connected to said member to gradually resist the movement of the latter in one direction, exhibiting means, a movable member for operating said exhibiting means, and a cam surface carried by said member arranged to act upon said exhibitor operating member to move the same in proportion to the square root of the differences of pressures in the two chambers.

4. In a meter, the combination with means in a main for causing differences of pressures by the flow therethrough, two chambers to which the differences of pressures are communicated, a piston acted upon by the pressures of both chambers, a pair of pendulums, links for operatively connecting said pendulums to said piston, exhibiting means, a movable member for operating said exhibiting means, and a cam surface carried by said movable member arranged to act upon said exhibitor operating member to move the same in a predetermined relation to the differences of pressures in the two chambers.

5. In a meter, the combination with means in a main for causing differences of pressures by the flow therethrough, two chambers to which the differences of pressures are communicated, a piston communicating with both chambers, a pair of pendulums pivotally mounted within one chamber and arranged to apply a gradually increasing resistance to the movement of said piston in one direction and exhibiting means operated by the movement of said piston.

In testimony whereof I affix my signature in presence of two witnesses.

HARRY S. DOLBEY.

Witnesses:
WINTHROP A. HALLOCK,
EDWARD E. WILLIAMS.